G. W. WISEMAN.
POTATO PICKER.
APPLICATION FILED MAR. 18, 1919.
1,315,693.
Patented Sept. 9, 1919.
2 SHEETS—SHEET 1.
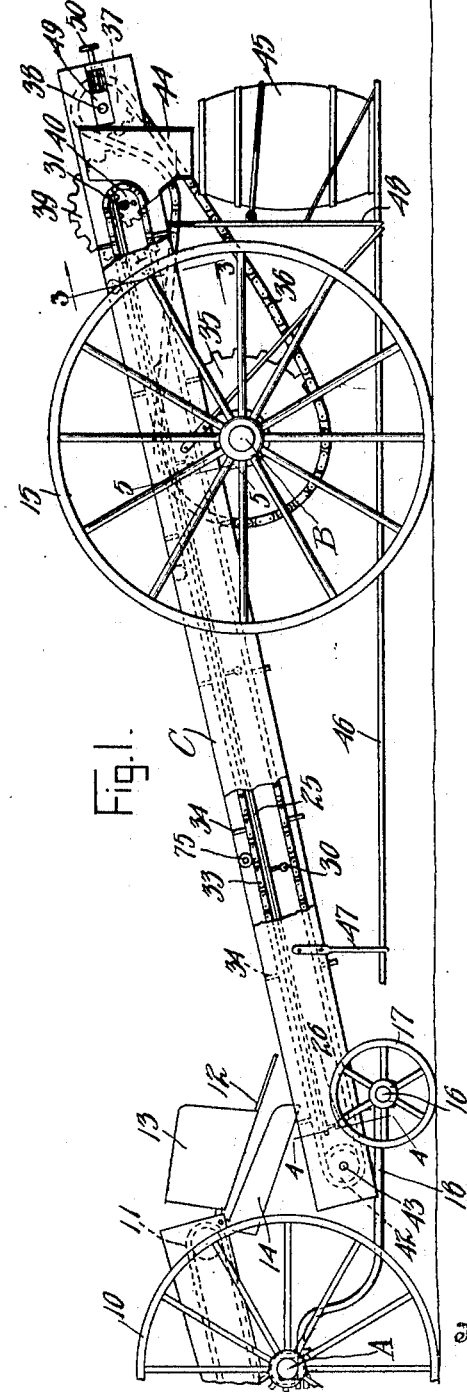
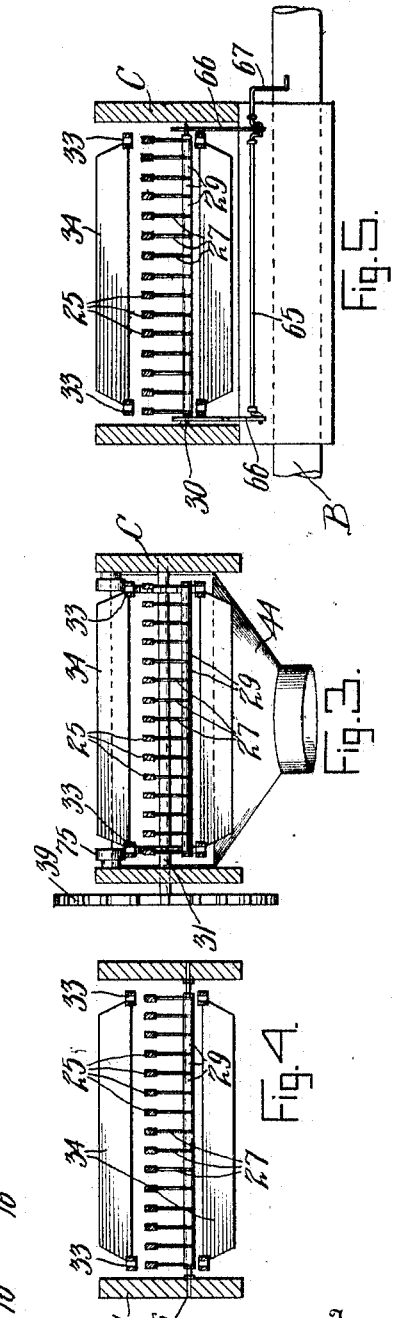
Inventor
Goodwin W. Wiseman.
By
Attorney

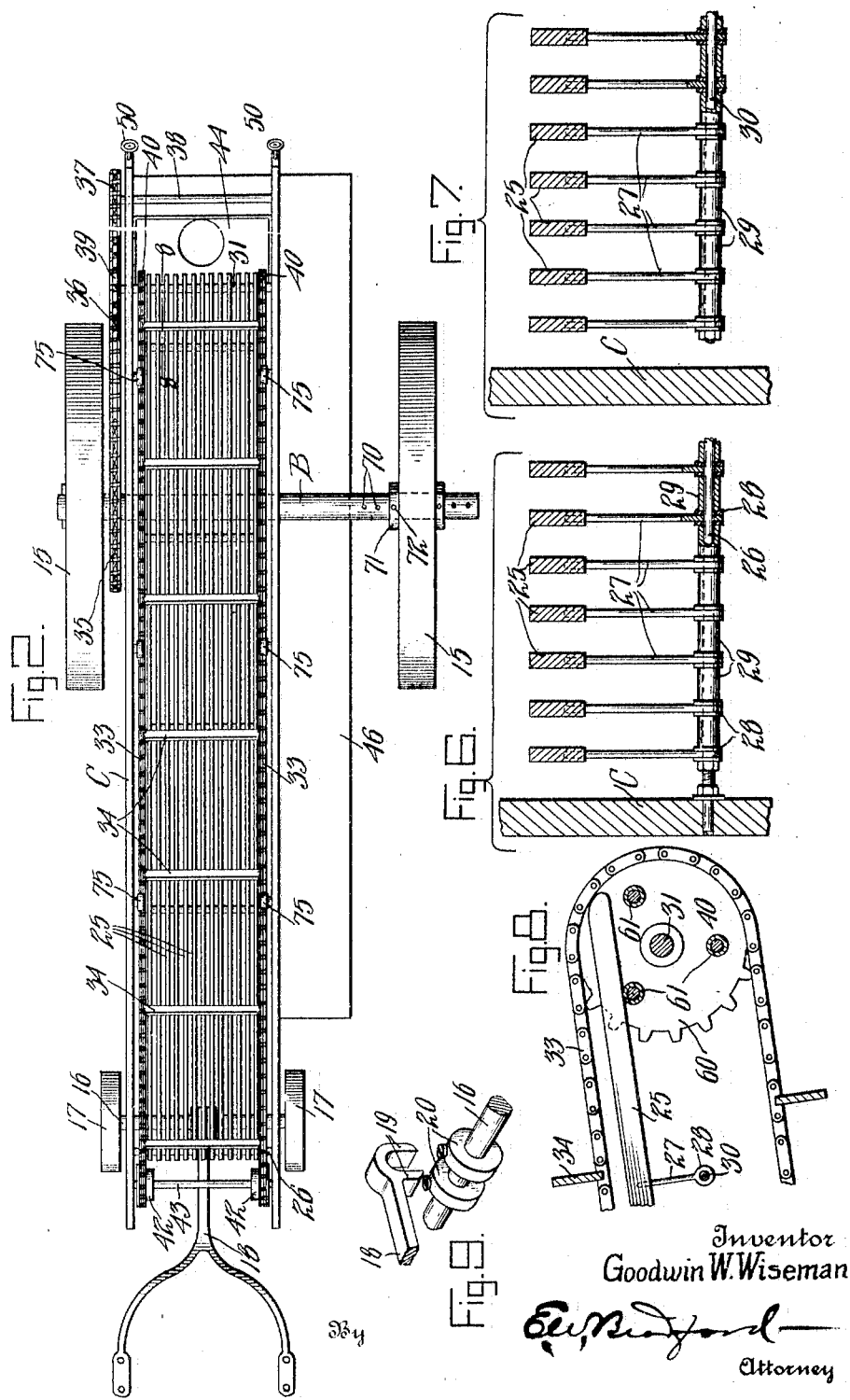

UNITED STATES PATENT OFFICE.

GOODWIN W. WISEMAN, OF WATERVILLE, MAINE.

POTATO-PICKER.

1,315,693. Specification of Letters Patent. Patented Sept. 9, 1919.

Application filed March 18, 1919. Serial No. 283,341.

*To all whom it may concern:*

Be it known that I, GOODWIN W. WISEMAN, a citizen of the United States, residing at Waterville, in the county of Kennebec and State of Maine, have invented certain new and useful Improvements in Potato-Pickers, of which the following is a specification.

My said invention consists in various improvements in the detail of construction and arrangement of parts of an apparatus for receiving potatoes from a potato digger and separating them from the tops, stones and clods that are picked up by the digger in the operation of removing the potatoes from the ground, and conveying the separated potatoes to a receptacle carried on the apparatus, said "picking" apparatus being detachably secured to the digger in position to receive the potatoes therefrom, all as will hereinafter be more fully described and claimed.

Referring to the accompanying drawings, which are made a part hereof and on which similar reference characters indicate similar parts, Figure 1 is a side elevation of one of my improved potato "pickers" attached to the rear end of a potato digger.

Fig. 2, a top or plan view thereof.

Fig. 3, a cross section on the dotted line 3—3 in Fig. 1.

Fig. 4, a cross section on the dotted line 4—4 in Fig. 1.

Fig. 5, a detail section on the dotted line 5—5 in Fig. 1.

Fig. 6, a detail section similar to a portion of Fig. 4 on an enlarged scale.

Fig. 7, a detail section similar to a portion of Fig. 3 on an enlarged scale.

Fig. 8, a detail section on the dotted line 8—8 in Fig. 2, and

Fig. 9, a detail view on an enlarged scale illustrating the connection between digger and picker more clearly.

In said drawings the portions marked A represent the rear axle of a potato digger, B the main axle of the potato picker, and C the frame of said potato picker.

The potato digger supported on the axle A and wheels 10 may be of any appropriate construction, such as several makes of potato diggers in common use. The potatoes are carried by an endless carrier 11 onto a reciprocating bottom 12, with sides 13, in position to be deposited on the potato picker.

Said bottom 12 is composed of slats spaced apart somewhat, as usual. A solid bottom 14 is mounted beneath said bottom 12 to receive any potatoes that may fall through and direct them onto the picker.

The potato picker is mounted upon a main truck consisting of the axle B and wheels 15, and a small truck near the front end composed of the axle 16 and wheels 17. Said forward truck is detachably connected to the rear axle of the potato digger A by means of a reach or tongue 18, preferably of the form shown most clearly in Fig. 2, having hounds connected to the axle A with a tongue detachably connected to the axle 16. The rear end of said tongue 18 is formed with members 19 adapted to hook over axle 18 between collars 20 positioned thereon, as most clearly shown in Fig. 9. Any other convenient construction providing for the ready attachment and detachment may, of course, be substituted for the one shown.

The potato picker frame C consists of side members appropriately mounted on the axles B and 16, and having a bottom composed of bars 25 extending from end to end thereof, said bars being spaced apart a sufficient distance to permit the dirt and other fine foreign matter deposited on the bottom with the potatoes to drop through to the ground, but supporting the potatoes for deposit into a receptacle at the rear end. In the drawings the spaces between bars 25 are exaggerated for the purpose of clearness in illustration, it being understood, of course, that they will be as close together as required by the work.

Said bars 25 are supported at their front end on a rod 26, the ends of which extend into and are supported by the side bars C. Each of said bars 25 is supported a distance above said rod on a vertical rod 27, the upper end of which is inserted in a perforation in the under side of the bar and the lower end of which has an eye or collar 28 mounted to rock on said rod 26. Distance sleeves 29 are mounted on said rod between said collars to hold the supports 27 and bars 25 the proper distance apart. The bottom thus constructed and comprising the bars 25 is stayed and held with said bars in proper relation to each other by having the same character of a structure at intervals throughout the length of the bottom, held together by rods 30, which rods, however, are not connected to the sides C but merely serve to support the bars laterally and hold them together. At the rear the bars may rest upon a reel composed of disks or wheels 60 mounted on a shaft 31 journaled in bearings in the side bars C, with cross rods 61, three or more in number, spaced apart around the wheels near the edge thereof, so that in rotating they serve to give the rear end of the bottom a vibratory movement, shaking the bottom composed of the bars 25 up and down and with a slight jarring motion which operates to shake the dirt through the bottom composed of the bars 25. In working where the soil is dry and light this jarring of the bottom 25 will not be required, however, and I provide means for supporting the rear end stationary, as well as the front end and regard such as the normal arrangement, as the shaking is not required in many localities, particularly in view of the length of the picker. Several ways of supporting said bottom from axle B will readily suggest themselves, as a simple block or bolster thereon and capable of ready removal. I have shown, however, a crank-rod 65 mounted on the axle and connected by rods 66 with the ends of cross rod 30 positioned over said axle. The cranks are so positioned and proportioned that when turned in the position shown in Fig. 5 the bars 25 will rest on the shaking reel at the outer end and when turned upward, by crank-handle 67, they will be raised free from said reel. When in this position the cranks rest against the face of the axle bolster in "over-center" position to maintain the parts securely.

Mounted to travel upon said bars is an endless carrier composed of chains 33 connected by cross bars 34 spaced at intervals throughout the length of the carrier. These bars 34 rest and travel upon the upper edges of the bars 25 and serve to carry the potatoes from the receiving to the delivery end of the bottom composed of said bars.

The wheels 15 are traction wheels keyed to the shaft B. A sprocket wheel 35 is secured to the shaft B and is connected by a sprocket chain 36 to a sprocket wheel 37 on a cross shaft 38 at the rear of the frame. Said sprocket chain 36 passes under another sprocket wheel 39 on the outer end of shaft 31. The upper ends of the chain belts 33 run over sprockets 40, which are likewise mounted on shaft 31, and their front ends run over sprocket wheels 42 on a shaft 43 at the front end of the frame to receive the potatoes from the carrier 34 and deposit them into a receptacle (as a barrel) 45 mounted on a platform carried by the frame beneath.

The axle B is made of a length sufficient to permit the traction wheel 15 on the working side of the machine to be spaced a considerable distance from said side and permit the hanging of a running board or platform 46 between said wheel and the side of the carrier. Said wheel 15 is adjustable on the shaft by means of a series of holes 70 in the shaft and in hub 71 and cotter pins 72, so as to adapt the machine for use in fields of varying distances between rows. Said platform is mounted upon hangers 47 and 48 in a position near the ground so that the attendant standing thereon is able to do his work in an upright position and likewise be free to step from one position to another as may be most convenient or required by his work.

The shaft 38 is mounted in adjustable bearings 49 adapted to be adjusted by adjusting bolts 50 for the purpose of adjusting the tension of the driving sprocket chain 36, as will be readily understood.

Rollers 75 are preferably mounted on the sides of frame C at intervals in position to hold chains 33 from being raised by potatoes or other things which might become lodged under the same or the bars 34, if said chains were left to run loosely from end to end.

In operation the parts being in the relation shown in Fig. 1, the potatoes, together with such dirt and foreign substance as may be with them as they come from the digger, are deposited over the bottom 12 onto the bottom composed of the bars 25 and are moved along the surface of said bottom to the upper end thereof. The travel of the potatoes over the long bottom composed of the bars 25 results in causing all dirt, etc., to fall through to the ground, unless the soil in which the work is under way is heavy or "tough." In such cases the bottom is dropped onto the shaking reel at its upper end, as before described. The shaking or vibration of said bottom, caused by the rotation of said reel, causes all dirt and foreign substances capable of passing through the bars 25 to fall to the ground. The attendant stands on the platform or running board 46, preferably in a position between the axle B and the rear end of the machine, where he can reach over the side and pick off any stones, clods and potato tops that have not been removed by the action of the machine, when they reach this point, so that the potatoes deposited from the hopper 44 into the receptacle 45 are clean and free of all such foreign substances. It will be understood, of course, that the movement of the carrier 34 is very slow as the travel of the potato digger is necessarily slow so that the attendant has plenty of time for attention to his duty and thus enables the potatoes to be deposited in the receptacle 45 in a clean condition.

The readily detachable feature of this construction I deem of special importance, as it frequently happens that it is desirable to detach the picker in order to drive the digger into corners, or closer to fences, or to ends of fields, or turning points. In all cases where the use or operation of the digger would be retarded or interfered with by the picker as an attached implement, the picker, by my construction, can be readily detached, and then attached as soon as the digger gets into a situation where the picker can coöperate without hindrance to the digging operation.

In operation extra empty receptacles 45 may be carried on the running board 46 or on the platform at the rear, and supplies thereof are located in convenient relation throughout the field being harvested, so that as one barrel is filled it may be readily rolled from the rear of the platform and an empty barrel put in its place.

Having thus fully described my said invention what I claim as new and desire to secure by Letters Patent, is:

1. A potato picker comprising a wheeled frame, a slatted chute carried by the frame and composed of spaced slats, rods extending transversely across the framed structure and spaced beneath the slatted structure, other rods connected with the under edges of the slats and extending downwardly to and embracing the transverse rods, and spacers carried upon the transverse rods intermediate the downwardly extending rods.

2. In a potato picker a wheeled frame, a slatted chute comprising a plurality of slats with their major planes in a vertical position, rods extending transversely across the wheeled frame and spaced beneath the slatted structure, rods inserted into perforations in the lower edges of the slats and provided at their lower ends with eyes embracing the transverse rods, and spacers interposed between the downwardly extending rods and embracing the transverse rods.

3. In a potato picker a wheeled frame, a slatted chute carried upon the frame, a rigidly positioned transverse rod disposed beneath one end of the slatted structure, a rod disposed beneath the opposite end of the slatted structure, means to raise and lower the last mentioned rod, rods secured to the under edges of the individual slats and provided with eyes at their lower ends embracing the transverse rods and spacers interposed between the eyes of the downwardly extending rods.

4. A potato picker comprising a wheeled frame, a slatted structure mounted upon the frame and comprising spaced slats positioned with their major planes vertically, a rod extending rigidly and transversely across the slatted structure, rods secured to the lower edges of the individual slats and provided at their lower ends with eyes embracing the rigid transverse rod, means operable from the wheels for vibrating the slatted structure upon its bearing upon the rigid rod, a second rod extending transversely across the structure, means connecting the individual slats with the last mentioned rod, and means to move the last mentioned rod vertically to move the slatted structure into and out of engagement with the vibrating mechanism.

5. In a potato picker a wheeled frame, a slatted chute carried by the frame composed of spaced individual slats, means pivoting the slatted structure adjacent one end, a tappet operated by the wheeled mechanism for imparting vibration to the opposite end of the slatted structure and means to raise and lower the last mentioned end of the slatted structure into and out of operative engagement with the tappet mechanism.

In witness whereof, I, have hereunto set my hand and seal at Washington, D. C. this 22nd day of February, A. D. nineteen hundred and nineteen.

GOODWIN W. WISEMAN. [L. S.]

Witness:
E. W. BRADFORD.

Copies of this patent may be obtained for five cents each, by addressing the "Commissioner of Patents, Washington, D. C."